United States Patent [19]
Hagiuda et al.

[11] Patent Number: 5,878,291
[45] Date of Patent: *Mar. 2, 1999

[54] VARIABLE ILLUMINATING ANGLE MECHANISM FOR A FLASH UNIT

[75] Inventors: Nobuyoshi Hagiuda, Yokohama; Hideki Matsui, Fujisawa; Masakuni Ohta, Tokyo, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 681,460

[22] Filed: Jul. 23, 1996

[30] Foreign Application Priority Data

Jul. 26, 1995 [JP] Japan ..................................... 7-190680

[51] Int. Cl.⁶ .................................................. G03B 15/05
[52] U.S. Cl. .......................................... 396/175; 396/178
[58] Field of Search ........................ 354/149.1; 396/175, 396/178

[56] References Cited

U.S. PATENT DOCUMENTS

| | | | |
|---|---|---|---|
| 4,423,940 | 1/1984 | Kashihara et al. | 354/149 |
| 5,040,007 | 8/1991 | Hagiuda | 354/145.1 |
| 5,280,315 | 1/1994 | Nomura et al. | 396/175 |
| 5,363,162 | 11/1994 | Kaihara et al. | 396/175 |
| 5,384,612 | 1/1995 | Kaihara et al. | 396/175 |
| 5,502,530 | 3/1996 | Kaihara et al. | 396/175 |

FOREIGN PATENT DOCUMENTS

62-175721  8/1987  Japan .

Primary Examiner—Safet Metjahic
Assistant Examiner—Michael Dalakis

[57] ABSTRACT

A variable illuminating angle mechanism which can vary the illuminating angle of a flash unit. The variable illuminating angle mechanism includes a device which prevents a light emitting body or an illuminating lens from being moved in excess of a range of normal movement. The variable illuminating angle mechanism includes a drive shaft having a screw thread formed on a circumferential surface of the drive shaft and a drive device to rotationally drive the drive shaft. A transmission member in threaded connection to the drive shaft is moved by rotation of the drive shaft, and a transmission device moves the light emitting unit or the illuminating lens via movement of the transmission member. An escape device is positioned at at least one end of the drive shaft to disconnect the transmission member from the drive shaft when the transmission member is moved beyond a normal operating range of the light emitting unit or illuminating lens. When the escape device disconnects the drive shaft from the transmission member, the drive shaft rotates without driving the transmission member to prevent the variable illuminating angle mechanism from locking and causing damage to the variable illuminating angle mechanism components.

24 Claims, 4 Drawing Sheets

VARIABLE ILLUMINATING ANGLE MECHANISM FOR A FLASH UNIT

BACKGROUND OF THE INVENTION

1. Field of the Invention

The present invention relates to a flash unit having a variable illuminating angle mechanism which changes the illuminating angle of a flash unit, and, more particularly, the present invention relates to a variable illuminating angle mechanism for a flash unit which stops the movement of a light emitting body or an illuminating lens within the flash unit from exceeding a normal operating range.

2. Description of the Related Art

When flash photography is performed with a camera, it is necessary for the field angle of the photographic lens and the illuminating angle of the flash unit to overlap. In a conventional camera, to control the overlap of the field angle and the illuminating angle, the camera transmits data representing the focal length of the photographic lens to the flash unit, and the flash unit uses the focal length data to adjust the illuminating angle by causing a light emitting body or an illuminating lens to move. This type of camera is disclosed in Japanese Laid-Open Patent Publication No. JP-A-2-207139, and in Japanese Laid-Open Patent Publication No. JP-A-57-120922.

Figure 7:
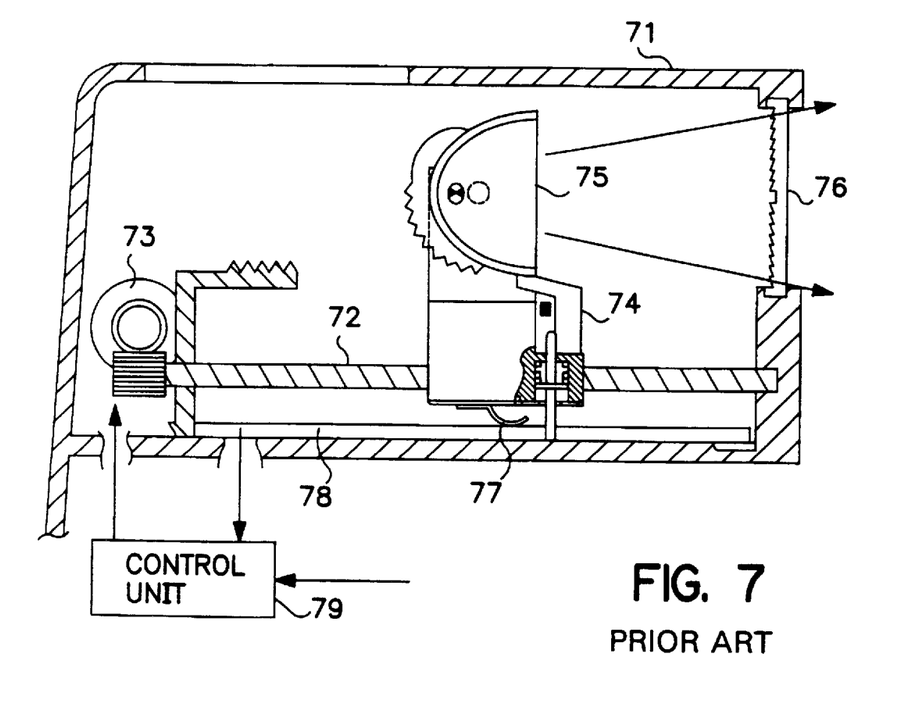
FIG. 7 is a diagram showing an example of a prior art flash device.

FIG. 7 is a cross-sectional diagram of a conventional flash unit 71 of the type described above. As shown in FIG. 7, the flash unit 71 includes a motor 73 which rotationally drives a freely rotatable drive shaft 72. A transmission member 74 is in threaded connection to the drive shaft 72, and is also connected to a light emitting body 75. As the motor 73 rotationally drives the drive shaft 72, the transmission member 74 is moved which in turn moves the light emitting body 75. Further, an illuminating window 76 consisting of a Fresnel lens is positioned in the illuminating direction of the light emitting body 75.

A contact 77 is fixed to the lower surface of the transmission member 74, and a contact point 78 located along the drive shaft 72 makes sliding contact with the contact 77. The contact point 78 is connected to a control unit 79, and an output of the control unit 79 is connected to the motor 73. An input terminal of the control unit 79 is connected to components in the camera.

In operation of the flash unit shown in FIG. 7, the control unit 79 calculates a target position of the light emitting body 75 according to focal length information provided from the camera to provide an appropriate illumination angle. Next, the control unit 79 measures the actual position of the light emitting body 75 according to the state of the contact point 78, and the control unit 79 provides a drive output to the motor 73 corresponding to the positional deviation of the target position and the actual position. The motor 73 then rotationally drives the drive shaft 72 according to the output from the control unit 79. The control unit 79 successively detects the position of the transmission member 74 as the light emitting body 75 is driven to the target position, and stops the motor 73 after it has driven the transmission member 74 and the light emitting body 75 to the target position. In the above-described manner, the illuminating angle of the flash unit 71 is adjusted by changing the position of the light emitting body 75 within the flash unit 71.

When, for example, a zoom lens is used, the focal length of the photographic lens frequently changes according to the photographic circumstances. Because of the frequent changes of the focal length when using a zoom lens, a mechanism as shown in FIG. 7 which adapts the illuminating angle to the focal length is advantageous to increase the mobility of photography.

However, when an input of data representing the position of the transmission member 74 is absent due to electrical open circuit or poor connection, the control unit 79 becomes unable to detect the position of the light emitting body 75. In such a state, the control unit 79 drives the motor 73 continuously. Further, because the flash unit 71 impresses a high voltage trigger on the light emitting body 75 at this instant, electrical noise acts on the control unit 79. Since the control unit 79 consists of a microcomputer or the like, the electrical noise causes operations other than the programmed operations to arise (hereinafter referred to as "runaway"), and there is a risk of the motor 73 continuing to rotate.

In the case that the control unit 79 is unable to detect position data of the transmission member 74, it is possible to stop the motor 73 if the motor 73 is caused to rotate for more than a predetermined time. Such a system is disclosed in Japanese Examined Patent Publication JP-B-7-27150.

However, in the case that runaway of the control unit 79 occurs, a stop command by the control unit 79 is not generated, and no stop operation is performed. If no stop operation is performed, the motor 73 continues to rotate, and there is a risk of failure of the variable illuminating angle mechanism. Moreover, when the transmission member 74 reaches the end of the drive shaft 72, and the rotation of the motor 73 is forced to stop (hereinafter referred to as "lock"), a risk of failure of the motor 73 arises.

Generally, as a countermeasure against the kinds of problems described above, a slipping clutch is disposed between the motor 73 and the drive shaft 72 so that the motor 73 does not lock. However, when a slipping clutch is used between the motor 73 and the drive shaft 72, it is necessary to provide a sliding surface with a predetermined static frictional force in order to transmit the drive force to the drive shaft 72 during normal operation. A problem occurs in that a comparatively large sliding frictional force occurs during an abnormality, causing the sliding surface to wear and its durability to become low.

Furthermore, a problem occurs in that the large sliding frictional force acts on both the motor 73 and the drive shaft 72, becoming a new origin of failure in the variable illuminating angle mechanism.

Moreover, a problem occurs in that the necessity of using a slipping clutch between the motor 73 and the drive shaft 72 causes the transmission mechanism to become complicated. As a result, the ease of assembly of the flash unit becomes poor and the size of the flash unit is increased.

SUMMARY OF THE INVENTION

It is an object of the present invention to provide a variable illuminating angle mechanism for a flash unit which prevents locking of a drive device due to anomalous operation and has a high durability and simple construction.

It is another object of the present invention to provide a variable illuminating angle mechanism for a flash unit which can accurately and rapidly restore the variable illuminating angle mechanism from a state in which locking of the drive device has been prevented to a state in which normal operation is possible.

It is another object of the present invention to provide a variable illuminating angle mechanism which quickly reinstates normal operation when an anomalous condition occurs.

It is yet another object of the present invention to provide a variable illuminating angle mechanism which can efficiently set a movement range of a light emitting body.

Additional objects and advantages of the invention will be set forth in part in the description which follows, and, in part, will be obvious from the description, or may be learned by practice of the invention.

Objects of the present invention are achieved with a variable illuminating angle mechanism for a flash unit, the variable illuminating angle mechanism including a drive shaft having a screw thread formed on the circumferential surface of the drive shaft and a screw escape device disposed at at least one end of the drive shaft which slidingly connects to the transmission member, a drive mechanism which rotationally drives the drive shaft, a transmission member which is in threaded connection to the drive shaft and which is moved by rotation of the drive shaft, a light emitting unit to illuminate a subject, an illuminating lens and a transmission device operatively coupled to the transmission member to cause movement of the light emitting body or the illuminating lens via the movement of the transmission member.

The variable illuminating angle mechanism for a flash unit also includes an urging device to urge the transmission member toward the center of the drive shaft. The urging device includes a flat plate spring member which is formed integrally with the transmission member, and a limiting member which comes into contact with the spring member when the transmission member is moved to the screw escape device.

The transmission device of the variable illuminating angle mechanism also includes a support unit which supports the light emitting unit or the illuminating lens, and a cam groove which converts the movement of the transmission member into movement of the support unit. At least one end of the cam groove may be a linear cam which is formed approximately parallel to the movement direction of the transmission member.

In accordance with embodiments of the present invention, when the drive mechanism rotates the drive shaft, the transmission member, which is in threaded connection to the drive shaft, moves along the drive shaft. The movement of the transmission member is transmitted by the transmission device, and converted into movement of the light emitting unit or of the illuminating lens.

When an anomalous operation of the drive mechanism occurs, and the light emitting body or the illuminating lens continues to be driven, the transmission member moves along the drive shaft as far as a screw escape device which is disposed at at least one end of the drive shaft. The screw escape device and the transmission member mutually slip, and the transmission member does not move further than the screw escape device causing the drive shaft to turn without further driving the transmission member. Accordingly, because the transmission member does not move further when it teaches the screw escape device, the variable illuminating angle mechanism is not damaged. Moreover, because the drive shaft slips, the lock state of the drive device can be accurately avoided.

In accordance with embodiments of the present invention, the urging device provides an urging force to the transmission member toward the center of the drive shaft when the transmission member is moved as far as the screw escape device. Since the urging device exerts an urging force on the transmission member toward the center of the drive shaft, by reversing the rotation of the drive shaft when the transmission member reaches the screw escape device, the transmission member can easily be caused to be screw connected to the drive shaft.

By disposing the urging device in this manner, the drive shaft is rotated in the reverse direction to eliminate the anomalous drive state, and further, the variable illuminating angle mechanism is rapidly returned to a normal state in which the illuminating angle can again be varied.

In accordance with the present invention, the spring member also moves accompanying the movement of the transmission member. The spring member provides an urging force toward the center of the drive shaft when the transmission member is positioned in the screw escape device by contact with the outer side of a limiting member. In particular, when the screw escape devices are disposed on both sides of the drive shaft, a simple construction comprising a single spring member and two limiting members positioned on both sides of the single spring member causes the desired urging force to act on the transmission member.

In accordance with embodiments of the present invention, the movement of the transmission member is transmitted to the support member via a translation cam. By moving the support member which supports the light emitting body or the illuminating lens, the illuminating angle of the flash unit can be varied.

However, during normal operation of the variable illuminating angle mechanism, the transmission member moves within a range in which a screw escape device is not positioned. Once an abnormal state arises, the light emitting body or illuminating lens is moved exceeding the normal movement range and the transmission member moves to the screw escape device. When the normal movement range is exceeded, it is necessary to maintain the path of movement of light emitting body or illuminating lens, and the flash unit has to be made a large size.

In accordance with embodiments of the present invention, at least one end of the cam shape of the translation cam is formed approximately parallel to the movement direction of the transmission member. When the transmission member moves a range of the screw escape device, the part of the translation cam which is parallel to the movement direction of the transmission member limits the amount of movement of the light emitting body or illuminating lens because the cam no longer transmits movement to the support member. Accordingly, a normal extent of movement path may be maintained, without the flash unit being made large.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENT

Reference will now be made in detail to the preferred embodiments of the present invention, examples of which are illustrated in the accompanying drawings wherein like reference numerals refer to the same or similar elements throughout.

Figure 1:
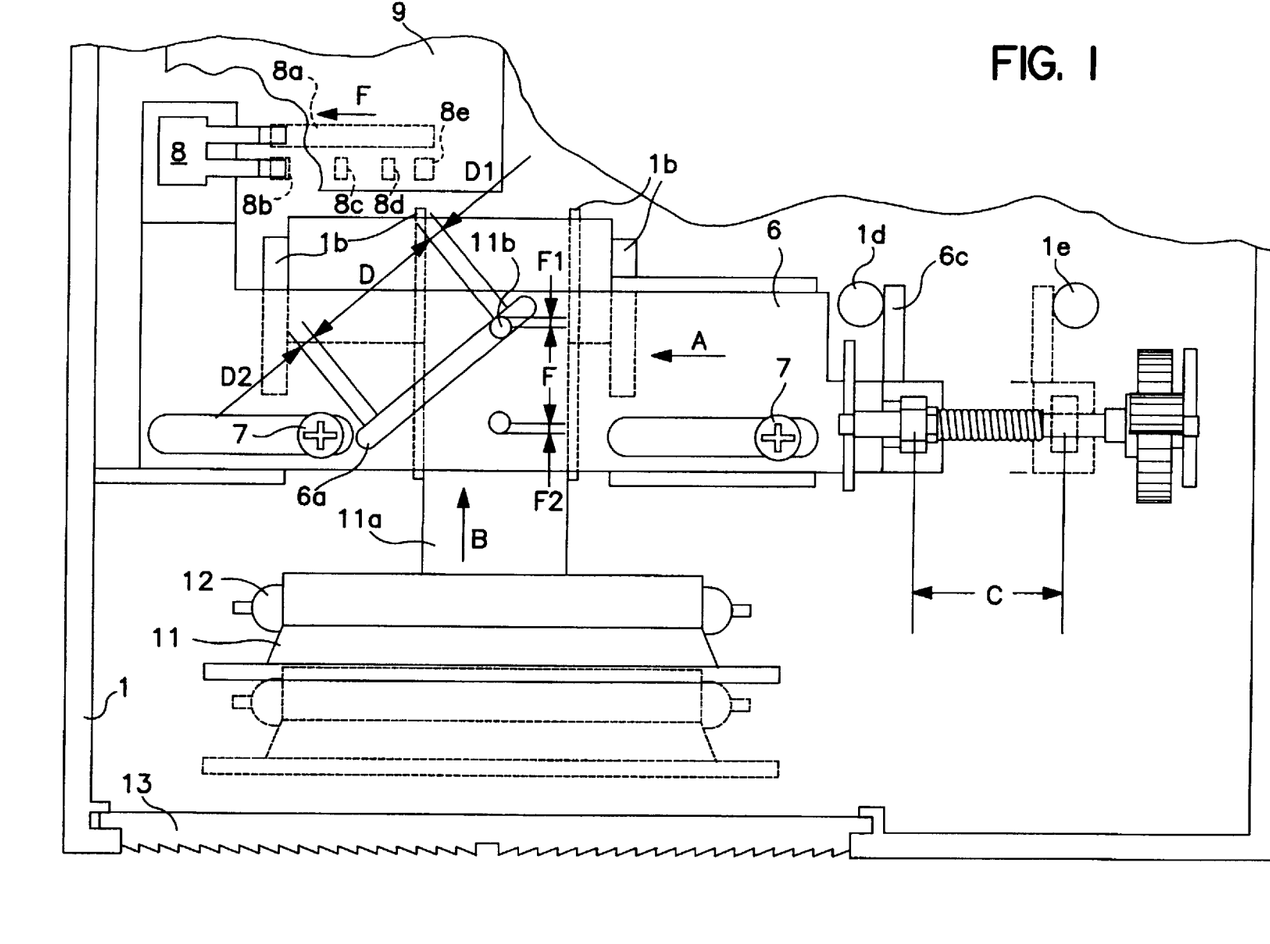
FIG. 1 is a top view of a variable angle illuminating mechanism in accordance with embodiments of the present invention.
Figure 2:
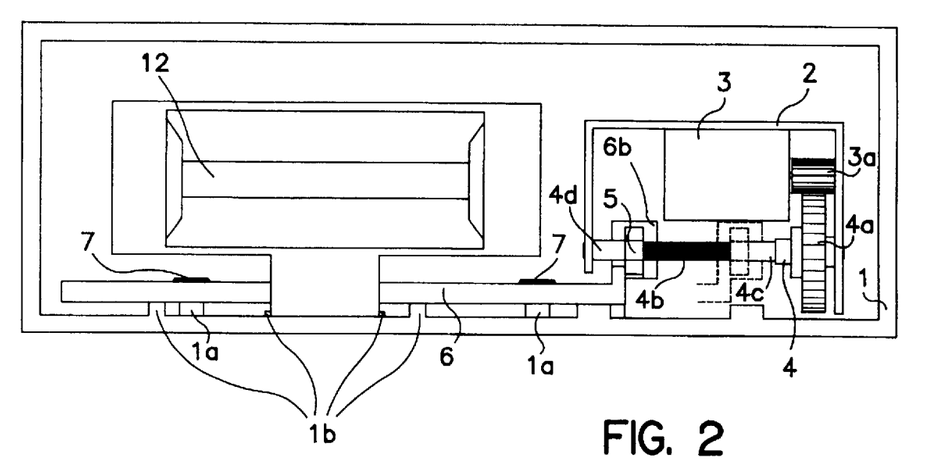
FIG. 2 is a front view of the variable illuminating angle mechanism in accordance with embodiments of the present invention.

FIG. 1 is a top view of a variable angle illuminating mechanism suitable for a camera flash unit in accordance with embodiments of the present invention. FIG. 2 is a front view of the variable angle illuminating mechanism for a flash unit in accordance with embodiments of the present invention. Embodiments of the present invention will be described first with reference to FIGS. 1 and 2.

As shown in FIGS. 1 and 2, a fixing member 2 (see FIG. 2) located within the flash device body 1 fixes a drive mechanism system for the variable illuminating angle mechanism. The drive mechanism system includes a motor 3 located on the rear side of the fixing member 2. The rotation of the motor 3 is transmitted via the engagement of gears 3a, 4a to a freely rotatable drive shaft 4. The drive shaft 4 includes a screw threaded portion 4b cut in its center, and screw escape portions 4c, 4d disposed on both sides of the drive shaft 4. The screw escape portions 4c, 4d are portions of the drive shaft 4 in which a screw thread is not cut.

The drive shaft 4 is threaded into a square nut 5, and a left/right slide plate 6 is fixed to the square nut 5. The left/right slide plate 6 is positioned for free rectilinear motion in a right and left direction corresponding to the arrow A in FIG. 1 according to the movement of the square nut 5.

The square nut 5 and the left/right slide plate 6 act as a transmission member to transmit the rotation of the drive shaft 4 to a light emitting unit 11. A contact 8 (FIG. 1) is fixed to the left/right slide plate 6, and a printed plate 9 is fixed in the flash unit body 1 at a position to make sliding contact with the contact 8. A common contact point 8a, which normally makes contact with one side of the contact 8, and contact points 8b–8e which make contact with the other side of the contact 8, are located on the printed plate 9. The contact 8 and the contact points 8b–8e operate as an encoder to detect a position of the left/right slide plate which corresponds to an illumination angle position.

As shown in FIG. 1, a cam groove 6a is formed in the left/right slide plate 6. A projection 11b, which is fixed to a forward/backward slide plate 11a, is inserted and freely slides in the cam groove 6a. The forward/backward slide plate 11a slides freely in the forward and backward directions (the direction of arrow B in FIG. 1) and acts as a support member to support a light emitting unit 11 electrically wired with a xenon tube 12, and the like. As the left/right slide plate 6 moves in the left or right direction, the sliding movement of the projection 11b in the cam groove 6a acts as a transmission device to move the light emitting unit 11 in the forward/backward direction. The forward/backward slide plate 11a is engaged with a rail 1b which regulates the sliding direction of the light emitting unit 11. As shown in FIGS. 1 and 2, the left/right slide plate 6 is secured to the flash unit body 1 with fixed screws 7 which are screwed to screw receiving units 1a of the flash unit body 1. The fixed screws 7 fit in openings in the left/right slide plate 6 which allow the left/right slide plate 6 to move in the left and right directions. The forward/backward slide plate 11a is also secured beneath the left/right side plate 6 by the screws 7. Moreover, an illuminating lens 13 is positioned in an illuminating direction of the light emitting unit 11. Further, a flat spring 6c projects from the left/right slide plate 6. The flat spring 6c projects between limiting bosses 1d, 1e located on either side of the flat spring 6c, which limit movement of the flat spring 6c.

Figure 3:
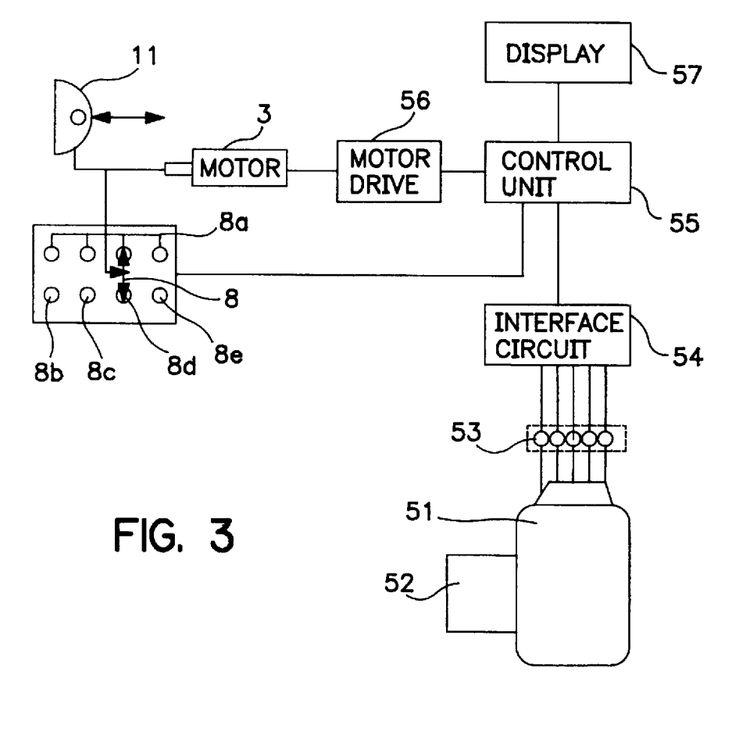
FIG. 3 is a diagram showing an electrical control system for the variable angle illuminating mechanism in accordance with embodiments of the present invention.

FIG. 3 is a diagram showing an electrical control system in accordance with embodiments of the present invention. As shown in FIG. 3, a camera 51 having, for example, a zoom lens 52 mounted thereon, transmits data representing a focal length of the zoom lens 52 to an interface circuit 54 of the flash unit via a flash unit mounting contact point 53. The output of the interface circuit 54 is input to a control unit 55 which comprises a microcomputer, or the like, and associated circuitry. Further, the common contact point 8a and the contact points 8b–8e used for illumination angle position detection are connected to the control unit 55. The control unit 55 includes outputs which are respectively connected to a motor drive 56 and to a display 57. The output of the motor drive 56 is connected to a motor 3 which drives the light emitting unit 11.

The operation of the embodiments of the invention shown in FIGS. 1–3 will now be described below. The motor 3 is rotated in either the forward direction or the reverse direction according to the drive output from the motor drive 56. The rotation of the motor 3 is transmitted to the drive shaft 4 via the gears 3a and 4a. As the drive shaft 4 rotates, the square nut 5, which is in threaded engagement with the screw thread 4b, moves in the right or left direction in FIGS. 1 and 2 according to the direction of rotation of the drive shaft 4. The left/right slide plate 6 moves in the right or left direction accompanying the movement of the square nut 5.

The position of the left/right slide plate 6 is detected by the encoder comprising the contact 8 and the contact points 8b–8e, and the detected position of the left/right slide plate 6 is input to the control unit 55. The control unit 55 determines a control amount which causes the field angle of the zoom lens 52 to correspond to the illumination angle of the flash device, and outputs the control amount to the motor drive 56. The motor drive 56 provides a drive output to the motor 3 which corresponds to the control amount determined by the control unit 55.

Figure 4:
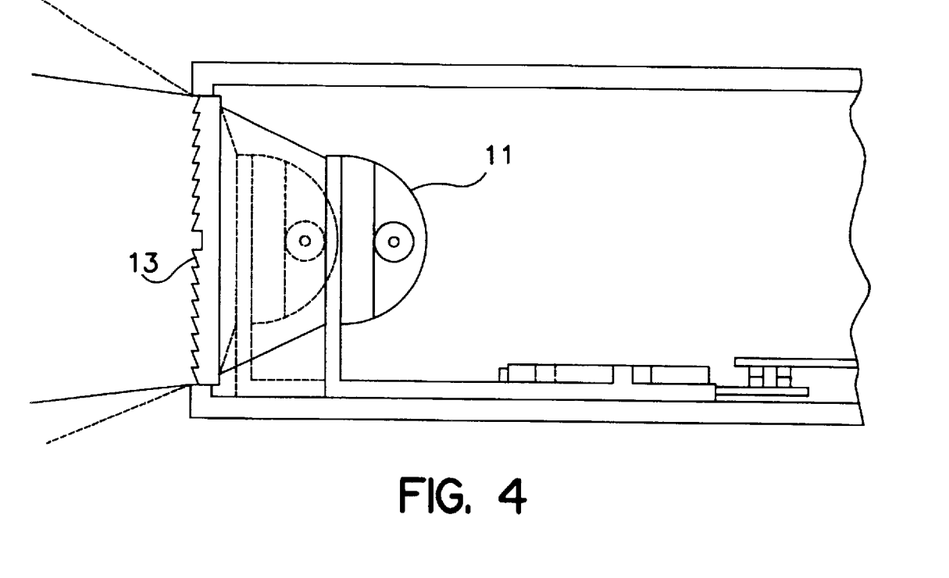
FIG. 4 is a diagram illustrating the change of illuminating angle of a flash device having the variable angle illuminating mechanism in accordance with embodiments of the present invention.

Since, as shown in FIG. 1, the cam groove 6a is disposed obliquely in the left/right slide plate 6, the movement of the left/right slide plate 6 causes the forward/backward slide plate 11a and the light emitting unit 11 to move in the forward/backward direction by movement of the projection 11b within the cam groove 6b. In the above-described manner, the light emitting unit 11 moves forward and backward corresponding to the left and right movement, respectively, of the left/right slide plate 6, and the illuminating angle of the flash unit is made to vary by changing the distance from the light emitting unit 11 to the illuminating lens 13, as shown in FIG. 4.

Figure 5:
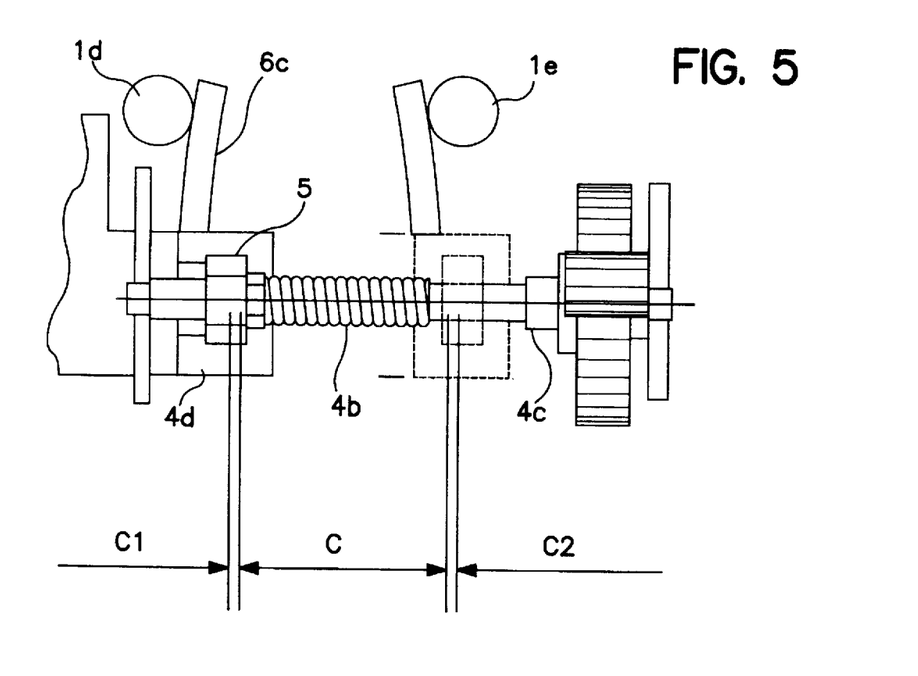
FIG. 5 is a diagram illustrating a spring mechanism and an urging mechanism of the variable angle illuminating mechanism in accordance with embodiments of the present invention.

The square nut 5 moves within a range of normal movement shown as a range C in FIGS. 1 and 5. When the movement of the square nut 5 is limited to the range C, the flat spring 6c which is integral with and projecting from the left/right slide plate 6 does not strike the limiting bosses 1e, 1d formed integrally with the flash unit body 1. However, when abnormalities arise in the control of the motor 3, the square nut 5 exceeds the normal operating range C, and moves into an abnormal operating range C1 or C2, as shown in FIG. 5.

Accordingly, it is necessary to provide a cam groove 6a having ranges D, D1 and D2 (FIG. 1) in which the projection 11b moves, corresponding to the operating ranges C, C1 an C2, respectively, of the square nut 5. Further, the forward/backward slide plate 11a moves within ranges F, F1 and F2 (FIG. 1) corresponding to the operating ranges C, C1 and C2, respectively, of the square nut 5.

When the square nut 5 moves into the abnormal operating range C1, C2, the square nut 5 moves outside the screw threaded portion 4b of the drive shaft 4, and is positioned in one of the screw escape portions 4c, 4d. The square nut 5 slips when it reaches the screw escape portions 4c, 4d because no screw thread is cut in the screw escape portions 4c, 4d. Because of the slippage of the square nut 5 when the square nut 5 reaches the screw escape portions 4c, 4d, the left/right slide plate 6 does not move beyond the screw escape portions 4c, 4d, and damage to the variable illumination angle mechanism can be prevented.

Moreover, when the square nut 5 slips when it reaches the screw escape portions 4c, 4d, the drive shaft 4 is rotated idly. Accordingly, because the drive shaft 4 is rotated idly when the square nut 5 is in the slipped state, the motor 3 is prevented from reaching the "lock" state. Thus, the screw escape portions 4c, 4d act as escape devices which prevent the square nut 5 and left/right drive plate 6 from being driven further when an abnormal operating condition occurs, thereby preventing damage to various components of the variable illumination angle mechanism.

Furthermore, when the square nut 5 becomes positioned in the screw escape portion 4c (or 4d), the flat spring 6c comes into contact with the limiting boss 1e (or 1d). When the flat spring 6c comes into contact with the limiting boss 1e (or 1d), the flat spring 6c confers an urging force on the left/right slide plate 6 toward the center of the drive shaft 4. Accordingly, if the drive shaft 4 is rotated in a direction which is reverse to the direction of rotation which caused the square nut 5 to reach the screw escape portions 4c, 4d, the thread of the square nut 5 is urged by the limiting boss 1e (or 1d) to engage with the screw threaded portion 4b, and the square nut 5 can return to the normal operating range C.

A description of the operation of the variable angle illuminating mechanism during an example of an abnormal operating condition will now be provided below.

For example, when the focal length of the zoom lens 52 is shortened to 28 mm, the control unit 55 receives an instruction from the camera 51 for the light emitting unit 11 to move to a position corresponding to a 28 mm focal length. As the left/right slide plate 6 is moved according to the instruction from the control unit 55, the contact 8 slides and short circuits the common contact point 8a and the contact point 8b which is at a position corresponding to the 28 mm focal length illuminating angle position. When poor contact between the contact 8 and any of the contacts 8a and 8b occurs during control of the movement of the left/right slide plate 6, detection of the 28 mm focal length illuminating angle position becomes impossible, and the light emitting unit 11 is moved further forward.

As the light emitting unit is moved further forward, the screw engagement of the square nut 5 and the screw threaded portion 4b is disconnected when the square nut 5 reaches a screw escape portion 4c, 4d. After the screw engagement of the square nut 5 and the screw threaded portion 4b is disconnected, the motor 3 continues to rotate, but the variable illuminating angle mechanism is not moved further because the square nut 5 slips in the screw escape portion 4c or 4d. Moreover, the control unit 55 drives the motor 3 for only a predetermined time, and the control unit 55 can determine the abnormal drive state because the contact 8 does not reach the target illuminating angle position corresponding to a 28 mm focal length. Further, when the control unit 55 rotationally drives the motor 3 in the reverse direction, the square nut 5 easily engages with the screw threaded portion 4b due to the urging force of the flat spring 6c.

When the contact 8 reaches the 35 mm focal length position which is adjacent to the 28 mm position, the control unit 55 recognizes this position and stops the motor 3 at the 35 mm focal length. The display 57 then displays an abnormal state with methods such as flashing of the display 57 of the illuminating angle.

Furthermore, if, for any reason, runaway occurs in the microcomputer of the control unit 55, and the rotation of the motor 3 can not be stopped, if the user notices that the motor 3 is in a state of running idly, the user can cut off the power source. When the user does not notice that the motor 3 is in a state of running idly, the battery of the flash unit becomes exhausted, and stops. Accordingly, safety can be maintained in any case.

Moreover, in accordance with the embodiments of the present invention shown in FIGS. 1 and 2, the left/right slide plate 6 is fixed to freely advance with the fixed screws 7, and the forward/backward slide plate 11a is positioned beneath the left/right slide plate 6. This arrangement of the left/right slide plate 6, fixed screws 7 and forward/backward slide plate 11a prevents the floating up of both the forward/backward slide plate 11a and the left/right slide plate 6.

Furthermore, in accordance with embodiments of the present invention, the left/right slide plate 6, cam groove 6a, and flat spring 6c are integrally formed. Accordingly, the number of parts required is markedly curtailed, and the design can increase the ease of assembly. Moreover, the left/right slide plate 6, cam groove 6a and flat spring 6c may be integrally formed of inexpensive plastic resins, such as ABS, polycarbonate, polyacetal, polypropylene, nylon and the like which have coefficients of friction which are comparatively low, and have resilience as a flat spring. The design of these components can increase durability.

Figure 6:
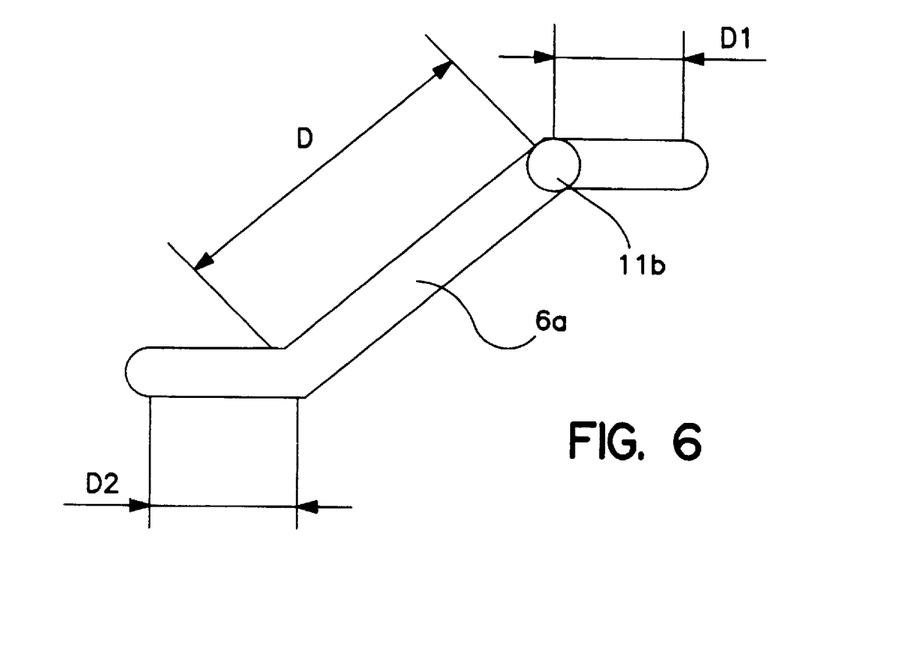
FIG. 6 is a diagram showing the shape of a cam in accordance with embodiments of the present invention.

FIG. 6 is a diagram showing a modification of the cam groove 6a of the left/right slide plate 6 in accordance with embodiments of the present invention. The cam groove 6a shown in FIG. 6 includes an oblique surface D and two surfaces D1, D2 which are formed in the left/right direction at either end of the oblique surface. The two surfaces D1, D2 are formed approximately parallel to the movement direction of the left/right side plate 6. In accordance with the cam groove 6a shown in FIG. 6, the projection 11b which engages with the cam groove 6a on the left/right slide plate 6 slides in the forward/backward direction within the oblique surface D in the range of normal movement (i.e., when the forward/backward slide plate 11a moves within the range F in FIG. 1).

However, when the left/right slide plate 6 is in a range of anomalous operation, the projection 11b is positioned in the range D1 or D2 at respective ends of the cam groove 6a. Therefore, since the projection 11b is positioned in a range D1 or D2 when the left/right slide plate 6 is in a range of anomalous operation, the projection 11b does not move in the forward/backward direction. Accordingly, the forward/backward slide plate 11a does not move in the forward/backward direction within the ranges F1 and F2 in FIG. 1, and the light emitting unit 11 does not move when the projection 11b is in the range D1 or D2. The range D of the cam groove 6a shown in FIG. 6 corresponds to the range of normal movement of the forward/backward slide plate 11a.

Further, in accordance with the cam groove 6a shown in FIG. 6, an abnormal movement range of the light emitting unit 11 is considered to become unnecessary. The positional relationship of the forward/backward direction of forward/backward slide plate 11a and the light emitting unit 11 does not take into account an abnormal movement range, and may be set according to the necessary illumination angle. Because of the arrangement of the cam groove 6a, the path of movement of the light emitting unit 11 becomes short, and the flash device body 1 can be designed as a small-sized unit.

Still further, in accordance with embodiments of the present invention, the rotation of the motor 3 is reduced via the gears 3a, 4a; however, the present invention is not limited to reducing the rotation of the motor 3 using gears. For example, by using a stepping motor, or the like comparatively slow motor, the drive shaft 4 may be formed on the rotation axis of the motor 3. Accordingly, with the drive shaft 4 formed on the rotation axis of the motor 3, it is not necessary to provide the drive shaft 4 as a separate body, and the structure of the drive mechanism can be further simplified.

Furthermore, in accordance with embodiments of the present invention, screw escape portions 4c, 4d are disposed at both ends of the drive shaft 4; however, the screw escape portions 4c, 4d are not limited to this arrangement, and, for example, a single screw escape portion may be disposed at any one end of the drive shaft 4.

Moreover, in accordance with embodiments of the present invention, the light emitting unit 11 is moved to change the illumination angle; however, the present invention is not limited to moving the light emitting unit 11 to change the illumination angle. For example, the illumination lens 13 may be moved to change the illumination angle using a mechanism similar to that used to move the light emitting unit 11.

In accordance with embodiments of the present invention, the transmission member advantageously does not move when the square nut 5 is beyond the screw threaded portion 4b because a screw escape portion 4c or 4d which provides a slip connection to the transmission member is disposed at at least one end of the drive shaft 4. Accordingly, damage to the variable illumination angle mechanism due to anomalous movement can be prevented with a simple construction.

Moreover, a lock state of the drive mechanism is avoided because the drive shaft 4 is made to run idly, and damage to the drive mechanism and the like can be prevented.

Furthermore, in the prior art slipping clutch, a predetermined static frictional force in the slipping surface being given, it was necessary to transmit the drive force normally. In contrast to the slipping clutch, with a screw escape device it is not necessary to transmit the drive force normally, and the friction with the transmission member can be designed to be extremely small. Accordingly, in comparison with a slipping clutch, the sliding frictional force arising in the contact surface of the screw threaded portion and the transmission member is small, and durability is greatly increased.

Moreover, the sliding frictional forces used in both the drive and the drive shaft simultaneously become small, and the loads affecting these sliding frictional forces become small, and do not become the origin of breakdowns.

Furthermore, in accordance with embodiments of the present invention, the ease of assembly of the flash unit is improved and the size of the flash unit is reduced because it is possible to simply form the screw escape portions where thread-shaped projections are not formed on the circumferential surface of the drive shaft.

Still further, in accordance with embodiments of the present invention, because the flat spring 6c gives the transmission member an urging force toward the center of the drive shaft 4 accompanying the reverse rotation of the drive shaft 4, the transmission member positioned in a screw escape portion is easily put in threaded engagement with the drive shaft 4. Accordingly, by causing reverse rotation of the drive shaft 4, the variable illumination angle mechanism can be quickly returned to a state in which the illuminating angle can again be varied. The urging device can be realized with a simple construction comprising one spring member and two limiting members.

In accordance with embodiments of the present invention, because the ends of the cam groove 6a of the translation cam are formed approximately parallel to the movement direction of the transmission member, when the transmission member moves to a screw escape portion 4c, 4d, the movement of the light emitting unit 11 or of the illuminating lens can be limited. Accordingly, the movement path of the light emitting unit 11 can be maintained, and the flash unit is not made large.

In the above-described manner, a variable illuminating angle mechanism invention can be realized with a simple structure and high safety and durability.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A variable illuminating angle mechanism for a flash unit, comprising:

a drive shaft having a screw thread formed on a circumferential surface of the drive shaft;

a drive device to rotationally drive the drive shaft;

a transmission member in connection with the drive shaft and which is driven by the rotation of the drive shaft;

an escape device disposed at at least one end of the drive shaft, wherein the escape device causes the drive shaft to stop imparting a drive force to the transmission member as the drive shaft rotates to stop driving of the transmission member when the transmission member is moved to the escape device by rotation of the drive shaft; and a transmission device to move one of a light emitting device and an illuminating device via the movement of the transmission member.

2. A variable illuminating angle mechanism for a flash unit as recited in claim 1, further comprising an urging device to urge the transmission member toward a center of the drive shaft when the transmission member is moved to the escape device.

3. A variable illuminating angle mechanism for a flash unit as recited in claim 2, wherein the urging device includes a spring member having one end fixed to the transmission member, and a limiting member which contacts the spring member when the transmission member is moved to the escape device.

4. A variable illuminating angle mechanism for a flash unit as recited in claim 1, wherein the transmission device includes a support member to support one of the light emitting unit and illuminating lens, and a cam formed in the transmission device to convert the movement of the transmission member into movement of the support unit.

5. A variable illuminating angle mechanism as recited in claim 4, wherein the cam has at least one end formed as a linear cam approximately parallel to the direction of movement of the transmission member.

6. A variable illuminating angle mechanism as recited in claim 1, wherein the transmission member comprises a square nut in threaded connection to the screw thread formed on the drive shaft and a slide plate connected to the square nut which is driven by the square nut.

7. A variable illuminating angle mechanism as recited in claim 6, wherein the transmission device comprises a cam groove formed in the slide plate and a support member to support one of the light emitting unit and the illuminating lens, the support member having a projection which moves within the cam groove.

8. A variable illuminating angle mechanism as recited in claim 1, wherein the transmission member is in threaded connection with the drive shaft, and the escape device disconnects the threaded connection of the transmission member to the drive shaft to stop transmission of a drive force from the drive shaft to the transmission member.

9. A variable illuminating angle mechanism for a flash unit, comprising:

a motor;

a drive shaft rotationally driven by the motor, the drive shaft including a threaded portion and at least one end which is not threaded;

a square nut capable of threaded engagement with the threaded portion of the drive shaft, and which is driven by the rotation of the drive shaft;

a left/right sliding plate connected to the square nut and which is driven by the square nut in one of a left and right direction with respect to the illumination direction of light from the flash unit, the sliding plate including an obliquely formed cam groove;

a forward/backward sliding plate having a projection inserted within the cam groove and which is moved in one of a forward and backward direction with respect to the illumination direction by the projection sliding within the cam groove when the left/right sliding plate is driven;

a light emitting unit attached to the forward/backward sliding plate which is moved in one of a forward and backward direction corresponding to movement of the forward/backward sliding plate to vary an illumination angle;

a control unit to provide instructions to the motor to drive the light emitting unit to a position corresponding to an illumination angle, wherein an abnormal operating condition causes the control unit to drive the light emitting unit beyond a predetermined range of movement, and the square nut reaches the non-threaded portion of the drive shaft causing the square nut and non-threaded portion to slip thereby stopping movement of the light emitting unit.

10. A variable illuminating angle mechanism as recited in claim 9, further comprising:

an encoder to detect the position of the left/right slide plate, wherein the abnormal operating condition includes a malfunction of the encoder.

11. A variable illuminating angle mechanism as recited in claim 9, wherein the abnormal operating condition includes failure of the control unit to provide a stop instruction to the motor.

12. A variable illuminating angle mechanism as recited in claim 9, further comprising a flat spring attached to the left/right sliding plate and a first and a second limiting boss positioned on opposite sides of the flat spring, wherein when the square nut reaches the non-threaded portion of the drive shaft, the flat spring contacts one of the first and second limiting bosses to urge the square nut toward the threaded portion of the drive shaft.

13. A variable illuminating angle mechanism for a flash unit, comprising:

a drive shaft having a screw thread formed on a circumferential surface of the drive shaft;

a drive device to rotationally drive the drive shaft;

a transmission member in connection with the drive shaft and which is moved by the rotation of the drive shaft;

a transmission device to move one of a light emitting unit and an illuminating lens via the movement of the transmission member;

an escape device disposed at at least one end of the drive shaft to disconnect the transmission member from the drive shaft, wherein the escape device causes the drive shaft and the transmission device to slip such that rotation of the drive shaft does not move the transmission member when the transmission member is moved to the escape device by rotation of the drive shaft; and an urging device to urge the transmission member toward a center of the drive shaft when the transmission member is moved to the escape device.

14. A variable illuminating angle mechanism for a flash unit as recited in claim 13, wherein the urging device includes a spring member having one end fixed to the transmission member, and a limiting member which contacts the spring member when the transmission member is moved to the escape device.

15. A variable illuminating angle mechanism for a flash unit as recited in claim 13, wherein the transmission device includes a support member to support one of the light emitting unit and illuminating lens, and a cam formed in the transmission device to convert the movement of the transmission member into movement of the support unit.

16. A variable illuminating angle mechanism as recited in claim 15, wherein the cam has at least one end formed as a linear cam approximately parallel to the direction of movement of the transmission member.

17. A variable illuminating angle mechanism as recited in claim 13, wherein the transmission member comprises a square nut in threaded connection to the screw thread formed on the drive shaft and a slide plate connected to the square nut which is driven by the square nut.

18. A variable illuminating angle mechanism as recited in claim 17, wherein the transmission device comprises a cam groove formed in the slide plate and a support member to support one of the light emitting unit and the illuminating lens, the support member having a projection which moves within the cam groove.

19. A variable illuminating angle mechanism for a flash unit, comprising:

a light emitting unit;

a drive system to drive light emitting unit to vary an illumination angle, the drive system including an escape device to disconnect the drive system from the light emitting unit when a predetermined range of movement of the light emitting unit is exceeded, the drive system including,     a drive shaft having a screw thread formed on a circumferential surface;

a drive device to rotationally drive the drive shaft;

a transmission mechanism in connection with the drive shaft and connected to the light emitting unit, which is moved linearly along the drive shaft by rotation of the drive shaft to transmit the movement of the drive shaft to the light emitting unit, wherein the escape device is disposed at at least one end of the drive shaft, and, when the transmission mechanism reaches the escape device, the transmission mechanism is disconnected from the drive shaft such that the drive shaft rotates without moving the transmission mechanism.

20. A variable illuminating angle mechanism as recited in claim 19, further comprising an urging device to urge the transmission mechanism toward a center of the drive shaft when the light emitting unit exceeds the predetermined range of movement.

21. A variable illuminating angle mechanism as recited in claim 19, wherein the drive system includes a drive shaft having a screw thread formed on a circumferential surface with the escape device positioned at least one end of the drive shaft.

22. A variable illuminating angle mechanism for a flash unit, comprising:

a drive shaft having a screw thread formed on a circumferential surface of the drive shaft;

a drive device to rotationally drive the drive shaft;

a transmission member in connection with the drive shaft and which is moved by the rotation of the drive shaft;

a transmission device to move one of a light emitting unit and an illuminating lens via the movement of the transmission member; and an escape device disposed at at least one end of the drive shaft to disconnect the transmission member from the drive shaft when the transmission member is moved to the escape device by rotation of the drive shaft, wherein the transmission member is in threaded connection with the drive shaft, and the escape device disconnects the threaded connection of the transmission member to the drive shaft to stop transmission of a drive force from the drive shaft to the transmission member.

23. A variable illuminating angle mechanism for a flash unit, comprising:

a light emitting unit;

a drive system to drive the light emitting unit to vary an illumination angle, the drive system including an escape device to disconnect the drive system from the light emitting unit when a predetermined movement range of the light emitting unit is exceeded, the drive system including     a drive shaft having a screw thread formed on a circumferential surface;

a drive device to rotationally drive the drive shaft;

a transmission mechanism in connection with the drive shaft and connected to the light emitting unit, which is moved linearly along the drive shaft by rotation of the drive shaft to transmit the movement of the drive shaft to the light emitting unit, wherein the escape device is disposed at at least one end of the drive shaft, and when the transmission mechanism reaches the escape device, the transmission mechanism is disconnected from the drive shaft such that the drive shaft rotates without moving the transmission mechanism, and wherein the transmission member is in threaded connection with the drive shaft, and the escape device disconnects the threaded connection of the transmission member to the drive shaft to stop transmission of a drive force from the drive shaft to the transmission member.

24. A camera system having a lens, comprising:

a drive shaft having a screw thread formed on a circumferential surface of the drive shaft;

a drive device to rotationally drive the drive shaft;

a transmission member in connection with the drive shaft and which is moved by the rotation of the drive shaft;

a transmission device to move an optical member via the movement of the transmission member in accordance with a focal length of the lens; and an escape device disposed at at least one end of the drive shaft, wherein the escape device causes the transmission member and the drive shaft to slip such that the rotation of the drive shaft does not move the transmission member when the transmission member is moved to the escape device by rotation of the drive shaft.

\* \* \* \* \*